United States Patent Office 3,467,568
Patented Sept. 16, 1969

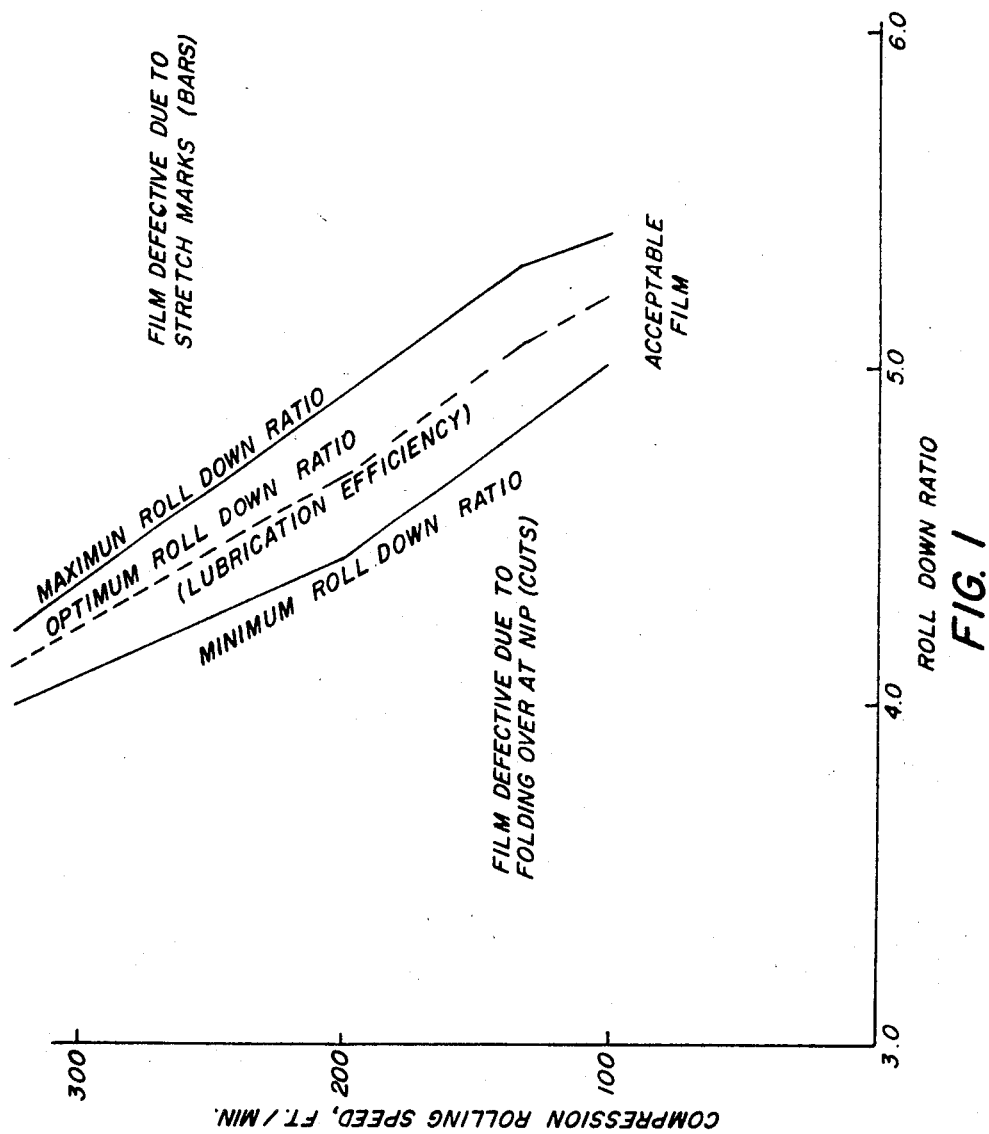

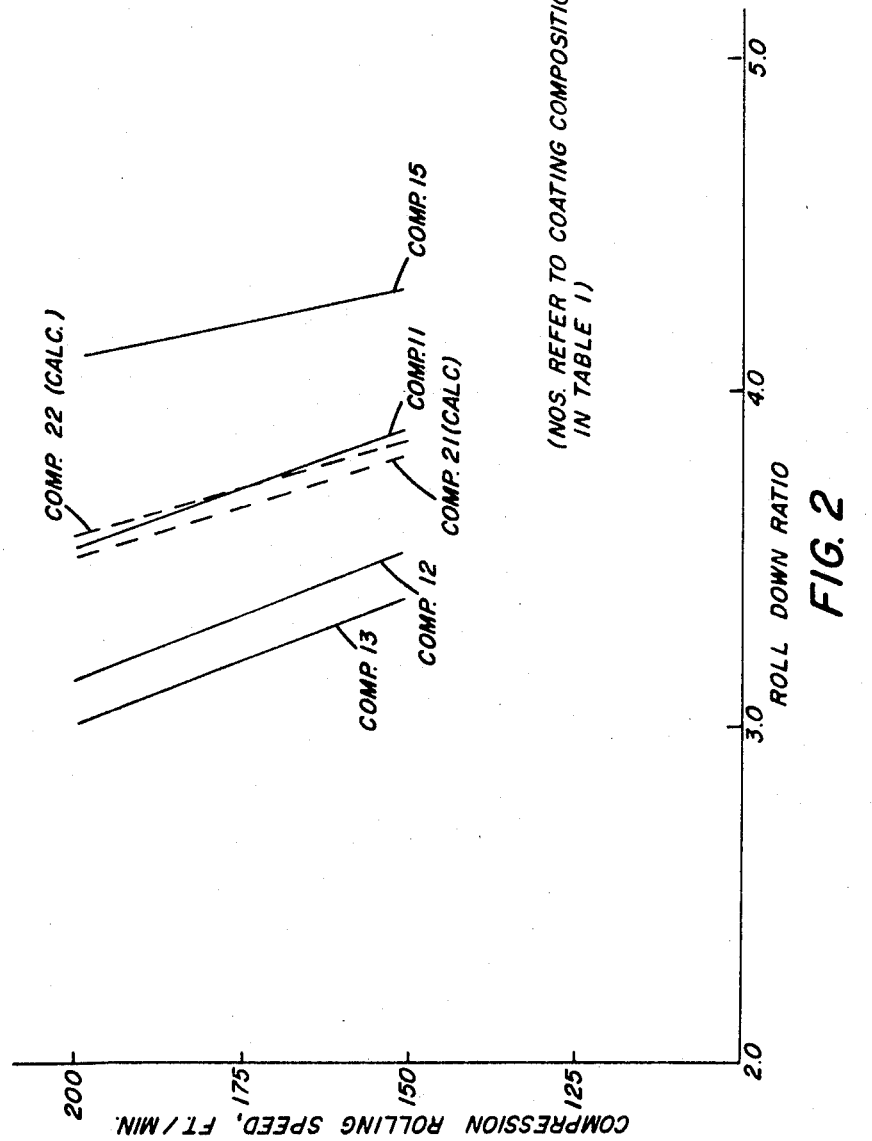

3,467,568
HEAT SEALABLE POLYETHYLENE FILM, LAMINATE AND PROCESS FOR FORMING THE SAME
Robert F. Williams, Jr., and Edward D. Morrison, Rochester, N.Y., assignors to Eastman Kodak Company, Rochester, N.Y., a corporation of New Jersey
Filed Feb. 1, 1966, Ser. No. 524,197
Int. Cl. B32b 27/04, 27/08, 31/12
U.S. Cl. 161—146       15 Claims

ABSTRACT OF THE DISCLOSURE

A self-lubricating, high slip, heat-sealable polyethylene film and method of making and sealing the same. A high density polyethylene film is coated with a composition containing a low density polyethylene, a fatty amide derivative and carnauba wax and the resultant article is pressure rolled to the desired thickness.

---

This invention relates to novel self-lubricating, high slip, heat-sealable polyethylene films which have important uses in the packaging and wrapping fields. More particularly this invention relates to a new and unique polyethylene film which is coated with a composition that permits the film to be both compression rolled and heat sealed without adversely affecting its physical properties or further treatment.

Heretofore heat-sealable moistureproof cellophane has been widely used and has been commonly heat-sealed in conventional heat-sealing packaging machinery, the heat sealing occurring at moderately elevated temperatures in the range of 275° F. to 400° F. Heat-sealing moistureproof cellophane came into wide usage commercially around 1930 or soon thereafter. The conventional heat-sealing moistureproof cellophane consists of a regenerated cellulose film coated with a nitrocellulose layer. It provides much greater moistureproofness than does ordinary uncoated cellophane, which had earlier been used, and has been widely used for the last twenty years or more for the packaging of bakery goods, meats, dried peas and various other grocery items, hardware items, etc. However, ordinary moistureproof cellophane is only relatively moistureproof and it is usually not recommended as a transparent packaging material for powdery materials such as dried milk, soft drink powders, hygroscopic drug or chemical powders, etc. Indeed ordinary hard candies packaged in moistureproof cellophane, when allowed to stand for a period of time under hot, humid atmospheric conditions, become stuck together in a manner undesirable from the merchandising viewpoint. In spite of its shortcomings, however, ordinary heat-sealable moistureproof cellophane heretofore has been, by far, the most widely used heat-sealing packaging material, making up on the order of 70% of the recent transparent packaging film market.

In an effort to provide a more moistureproof material, suitable in packaging many things for which ordinary heat-sealing moistureproof cellophane is not satisfactory, a polyethylene coated cellophane film has been put on the market relatively recently and has had a considerable usage, although the volume of its usage has been very small compared with that of ordinary moistureproof cellophane. It has the advantage that it lends itself to use in conventional heat-sealing equipment of the type available all over the country. It also has the advantage that it has added moistureproofness so as to make it suitable for packaging things like powdered sugar, dried soft drink mix, etc., for which conventional moistureproof cellophane is not sufficiently moistureproof to be useful. However, it has the disadvantage that it is subject to delamination, in that the outer layer of cellophane is sensitive to water and humidity conditions, becoming flimsy if the package becomes wet on the outside, and is rather expensive to produce.

Also in recent years plain polyethylene film has been used in making transparent packages. However it does not lend itself to heat-sealing on ordinary conventional jaw type heat-sealing packaging machinery, such as has been well known in the case of sealing moistureproof cellophane; but special techniques have been developed by which packages have been made from straight polyethylene. Nonetheless, these techniques require closer supervision and are not nearly so widely usable as the conventional type of equipment used to heat-seal moistureproof cellophane. Additionally, polyethylene has the shortcoming that in film form, i.e., no greater than about 10 mils thick, it is quite readily permeated by oxygen (undesirable in foodstuffs), and by solvent vapors, many aromatic materials (odors, bouquets, etc.), vegetable oils, etc., all of which limit the acceptability of polyethylene film as such for wide use in the packaging field.

Other films employed in the packaging industry, include rubber hydrochloride films, vinylidene chloride based films, vinyl chloride-vinyl acetate copolymer, cellulose acetate, and polyester films such as polyethylene terephthalate polyester film. None of these materials lend themselves to ready use on the most widely available types of heat-sealing packaging machinery. The rubber hydrochloride films have a relatively low maximum use temperature, e.g., about 200° F., and these films present a distortion problem. Vinylidene chloride films, in the thin gauges used in packaging, are very difficult to handle on packaging machinery, and have a very narrow range in which a heat-seal can be effected. Additionally, they present a problem with static electricity. Also, when a vinylidene chloride film is heat-sealed, this causes shrinkage and puckering, which spoils the attractiveness of the package which it is desired to preserve.

Vinyl chloride-vinyl acetate copolymer films, used to a very limited extent in the packaging field, cannot be heat-sealed on conventional packaging machinery, and only with difficulty, for example, by the use of electronic methods where the films are fused or welded together. Additionally these films have a relatively low maximum use temperature and, unless highly plasticized, are not useful at low temperatures; and if highly plasticized they present plasticizer problems in respect to migration, staining, toxicity, etc. Cellulose acetate films offer little protection against moisture vapor and cannot be heat-sealed by conventional cellophane heat-sealing methods. Polyester films, such as polyethylene terephthalate and similar films of other organic polymers having polyester linkages in the polymer chain, while providing great strength and many advantages, never had any substantial use in the packaging field prior to our invention. The polyester films could be heat-sealed only at quite high temperatures. Such films melt at around 490° F., and the polymer degrades at a temperature very close to that required for heat-sealing. The polyester films are not heat-sealable on any conventional heat-sealing packaging machinery and none had been developed prior to the invention to make polyester films usable to any substantial extent for packaging.

Some attempts were apparently made heretofore to laminate another film to a polyester film so as to make a polyester film useful in packaging. Some efforts were also made to laminate a film of polyethylene, for example, to a polyester film, but most of these efforts resulted in laminated film which would not remain bonded at the interface between the polyester and the polyethylene under conditions of usage. Modifying the surface of polyethylene items with selected coatings or deposits, especially the coating of a high density polyethylene with a low density polyethylene, has also been proposed and tested. Although surface modifications of this type have been found to be useful for improving or altering the heat-sealing characteristics of the coated polyethylene support, it has been discovered that they have the decisive disadvantage of increasing the blocking tendency and reducing the slip of the polyethylene support.

Thus, as a result of these limitations it has heretofore been impossible to produce a polyethylene film that could be both compression rolled and heat sealed unless extensive and expensive preconditioning steps were performed. Therefore, it is readily apparent that the production of a polyethylene film in which the desirable heat-sealing characteristics of, for example, low density polyethylene is retained while the slip, block and abrasion resistance of the film, especially that of the low density type, is significantly improved would represent a long sought after solution to an extremely perplexing problem. According to this invention it has been found that such a novel and unique film can be produced by coating a polyethylene support with a newly discovered coating material. Normally the polyethylene support is a high density polyethylene film and the coating material is a composition containing a low density, low molecular weight polyethylene, a fatty amide derivative, and carnauba wax.

Therefore, an object of this invention is to provide a polyethylene film that can be both compression rolled and heat sealed.

Another object of this invention is to provide surfaces on high density polyethylene films and sheetings which heat seal below the softening temperature of the support yet do not cause the blocking and slip characteristics of the support to become objectionable.

Yet another object of this invention is to provide a heat-sealable packaging film which can be used in conventional automatic packaging machinery of the type normally used for packaging articles in cellulose type films.

A further object of this invention is to provide a self-lubricating, high slip heat-sealable polyolefin film that has good resistance to scuffing or abrasion, an extremely low haze factor, a low heat sealing point, and will not block.

These and other objects and advantages of this invention will be more apparent upon reference to the following description, specific working examples, appended claims, and drawings where:

FIGURE 1 is a diagram showing the compression rolling characteristics of a heat-seal composition made in accordance with the teachings of this invention; and FIGURE 2 is a diagram comparing the compression rolling characteristics of several different heat-seal compositions made in accordance with the teachings of this invention.

As can be concluded from the above discussion, in order for a heat-seal coated compression rolled film to be considered as commercially practical it must have the following characteristics:

(1) When the film is heat sealed it must produce a strong bond. Minimum heat seal strength has been found to be about 0.25 lb./in. on films sealed at 225° F. using a one second heating iron dwell time. It is also important for the heat sealable material to have a tack temperature at least 20° F. below the softening temperature of the support material.

(2) The film must be slippery enough to feed in automatic packaging machines without sticking. Maximum static coefficient of friction has been found to be about 0.60 and kinetic coefficient of friction about 0.50. The preferred values would be 0.50 or less for static coefficient of friction and 0.40 or less for kinetic coefficient of friction. Coefficient of friction is measured in accordance with ASTM D1894 Procedure B "Tests for Coefficient of Friction of Plastic Films."

(3) While the film must be slippery enough to feed properly there must not be an excessive amount of slip additive on the surface as this gives the film a soft, greasy feel.

(4) Packages overwrapped with the film must not block, i.e. stick to each other when placed together.

(5) The heat-sealable coating or overlayer of material placed on the film support, if such an overlay is used, must be of the type that will not come off on the rollers through which the film is passed. Ideally this overlay material should also be as thin as possible and clear of any haze, distortion or decoloring properties.

(6) The film should also be capable of being worked if the user so desires. This "working" capability includes the characteristic of permitting compression rolling to give a film of any desired thickness.

(7) The stiffness of the film must be great enough to feed and prevent wrinkling in packaging machines. This means that the Young's modulus of the film must be greater than 200,000 p.s.i.

(8) Properties of film should not degenerate in storage or be affected by changes in temperature and/or humidity.

These characteristics or factors are especially important if the film is to be used for packaging articles in a cellophane-type overwrapping machine. Although it was generally conceded by most of those working in the cellophane-type overwrapping art that a film product having all of the above-listed attributes could not be produced it has been found that such a heat-sealable film not only can be produced, but that it can be manufactured in such a manner as to be highly competitive commercially with any heretofore known like-type film. The invention in its most basic form involves applying a special coating over a high density polyethylene support sheet or film. This coating is comprised of: (1) a low density polyethylene as a heat-sealable material; (2) one or more fatty amide derivatives as slip agents and compression rolling lubricants; and (3) a hardener and antiblock agent. In addition other additives such as anti-static agents may be added as desired.

It has been determined that not only must all constituents of the coating material (namely; the low density polyethylene, the fatty amide derivatives, and the hardener and antiblock agent) be present before an acceptable heat-sealable film can be produced, but that only certain selected ones of the numerous different types of polyethylenes, fatty amide derivatives, and hardener and antiblock agents that are available can be combined to give the desired results. To further complicate the issue it has been found that the ratio of these constituents can be varied over only a very limited range without the coating material losing its beneficial characteristics. In addition to the above, it is also important that the coating material be applied in a certain general manner if the desired end results are to be obtained.

In the instance of the low density polyethylene it has been found that the resins best suited for use in coating of these types are those that tack at temperatures at least 20° F. below the tack temperatures of the high density polyethylene support. These resins are normally those having densities of less than 0.920 g./cc. and melt indexes above 20. Of the numerous low density polyethylene resins that were evaluated, it has been found that a low density polyethylene having a density of 0.910 g./cc. and a melt index of 200 gives the most desirable results. This low density polyethylene is sold as "Tenite 812" by Eastman Chemical Products, Inc.

The fatty amide derivatives or oleamides that have been found most acceptable are the long chain fatty acid amides such as Armid-O, Armour 210 PE, Armid H.T., and Armoslip E (erucamide-$C_{21}H_{41}CONH_2$), all of which are sold by the Armour Industrial Chemical Company.

Waxes which are effective in these surface deposits are those which are harder than the mixtures of low density polyethylene and slip additive and which are compatible with the slip additive to the extent that the blends become clear when compression rolled. Carnauba wax, which is derived from the leaf of the carnauba palm, has been found to be an acceptable hardener and antiblock agent. This blend of coating material is applied to a high melting support base film, preferably high density polyethylene (density 0.960 g./cc. and melt index 5.0), from a xylene or like solution by any suitable method that will leave an extremely small and very precisely controlled, discontinuous, final coating after rolling of from .01 to .08 mil in thickness. This coating uniformity is important since it determines the quality of the finished rolled film. If an area is not coated adequately then a bar or haze will result while overcoating causes holes and rough finishes to result. Other solvents besides xylene can be used as long as they will dissolve the coating and keep it in solution at the coating temperatures. The amount of solvent to be used is determined by the coating method employed and the coverage to be applied. After the coating has been applied to the support base film the solvent is preferably evaporated to leave the blend as a "powder" on the surface of the film. This powder-like layer of blend is then heated till it fuses, and thus adheres, to the support base film.

As mentioned briefly hereinabove, changes in the proportion of each component in the coating have a pronounced effect on the ability of the coating to act as a rolling lubricant and on the amount of roll down that can be obtained at a given roll temperature and speed. Changes in the proportion of each component in the coating also affects the heat-sealing properties of the film as well. In order to illustrate the effect that these changes in proportion of each component in the coating have on the type of self-lubricating, high slip, heat-sealable film that is produced attention is directed to Table I which lists a number of compositions made with varying amounts of Tenite 812, Armid-O, Armour 210 PE, and carnauba wax. These compositions were dissolved in hot xylene and coated on extruded strips of a high density polyethylene at coverage levels from 0.39 to 0.56 lb. of dry coating/1000 sq. ft. of surface area.

Each coating was rolled at several different speeds under standard rolling conditions and the maximum and minimum roll down ratios determined—the maximum being the ratio at which the rolled film began to show hazy bands ("bars") caused by stretching and the minimum being the ratio at which the strip was fed into the compression mill nip faster than it could be rolled thus causing folding over and buckling and producing cuts in the film. The means between the maximum and minimum ratios at each speed (the optimum roll down ratio) was used as a quantitative measure of the ability of the coating to act as a lubricant. This ability was termed "lubrication efficiency" and coatings producing high roll down ratios at a given speed are said to have high lubrication efficiency whereas coatings producing low roll down ratios are said to have low lubrication efficiency.

By way of example, FIGURE 1 is a compression rolling diagram of a strip coated with a composition containing 3.46% of a low density polyethylene (Tenite 812), 0.35% of a slip additive (Armid-O), 0.35% of an antiblock agent and hardener (carnauba wax), 0.35% of a slip and antistatic agent (Armour 210 PE) and 95.5% of a solvent (xylene). The composition was applied to give a coverage of 0.39 lb. of coating/1000 sq. ft. of surface area after drying and curing. The minimum and maximum roll down ratios that could be obtained at 100, 150, 200, and 300 ft./min.; rolling speeds have been plotted and connected, as shown by the solid lines, in order to determine the area in which acceptable film can be obtained. The mean between the minimum and maximum roll down ratios at each speed was also plotted as indicated by the dotted line in FIGURE 1. This line represents the optimum roll down ratio for this particular coating composition and has been used as a measure of its lubrication efficiency. This coating is shown in Table I as Composition No. 2 and has lubrication efficiency values of 4.99 at 150 ft./min. and 4.69 at 200 ft./min.

By constructing similar rolling speed-roll down ratio diagrams for other coatings and by comparing optimum roll down ratios at the same speeds, a quantitative comparison of lubrication efficiency has been obtained. Table I shows the lubrication efficiency values obtained for the various coating compositions at rolling speeds of 150 and 200 ft./min. Coating compositions are shown in terms of the original solution (4.5% total solids content and 95.5% xylene), however, all compositions were dried and cured before compression rolling. In order to determine the effect of each coating component and also the effect of coverage on lubrication efficiency a multiple regression analysis was made of the data in Table I. This was done by using the equation:

$$Y = B_1 X_1 + B_2 X_2 + B_3 X_3 + B_4 X_4 + B_5 X_5$$

wherein Y is lubrication efficiency, $X_1$ is the proportion of Tenite 812, $X_2$ is the proportion of Armid-O, $X_3$ is

TABLE I

| | Coating composition, percent (based on 4.5% total solids) | | | | Dry coverage lb./1,000 sq. ft. of surface | Lubrication at 150 ft./min. rolling speed | | | Efficiency, at 200 ft./min. rolling speed | | |
|---|---|---|---|---|---|---|---|---|---|---|---|
| | Tenite 812 | Armid-O | Carnauba wax | Armour 210 PE | | Actual | Calculated | Percent diff. | Actual | Calculated | Percent diff. |
| Composition No.: | | | | | | | | | | | |
| 1 | 3.21 | .32 | .64 | .32 | .39 | 4.54 | 4.49 | 1 | 4.28 | 4.04 | 6 |
| 2 | 3.46 | .35 | .35 | .35 | .39 | 4.99 | 4.95 | 1 | 4.69 | 4.70 | 0 |
| 3 | 3.21 | .43 | .43 | .43 | .39 | 5.47 | 5.45 | 0 | 5.18 | 5.16 | 0 |
| 4 | 3.46 | .52 | .26 | .26 | .39 | 5.39 | 5.25 | 3 | 5.21 | 5.13 | 1 |
| 5 | 3.25 | .00 | .64 | .64 | .39 | 4.86 | 4.66 | 4 | 4.53 | 4.22 | 9 |
| 6 | 3.46 | .44 | .30 | .30 | .39 | 4.88 | 5.10 | −5 | 4.68 | 5.03 | −7 |
| 7 | 3.46 | .44 | .30 | .30 | .45 | 5.02 | 5.16 | −3 | 4.80 | 4.90 | −2 |
| 8 | 3.46 | .35 | .35 | .35 | .46 | 5.05 | 5.02 | 1 | 4.84 | 4.68 | 3 |
| 9 | 3.75 | .28 | .19 | .28 | .51 | 4.57 | 4.70 | −3 | 4.21 | 4.40 | −5 |
| 10 | 3.91 | .00 | .00 | .59 | .39 | 5.17 | 4.99 | 4 | 5.14 | 4.78 | 7 |
| 11 | 4.02 | .16 | .16 | .16 | .56 | 3.89 | 3.93 | −1 | 3.54 | 3.54 | 0 |
| 12 | 4.28 | .00 | .00 | .22 | .46 | 3.53 | 3.66 | −4 | 3.14 | 3.43 | −9 |
| 13 | 4.40 | .00 | .00 | .10 | .46 | 3.39 | 3.22 | 5 | 3.01 | 3.00 | 0 |
| 14 | 3.75 | .325 | .10 | .325 | .56 | 5.24 | 5.14 | 2 | 5.06 | 4.84 | 4 |
| 15 | 3.91 | .00 | .15 | .45 | .46 | 4.31 | 4.41 | −2 | 4.11 | 4.04 | 2 |
| 16 | 3.46 | .00 | .35 | .70 | .51 | 5.12 | 5.22 | −2 | 4.67 | 4.64 | 1 |
| 17 | 3.46 | .00 | .35 | .70 | .46 | 5.33 | 5.18 | 3 | 4.53 | 4.65 | −3 |
| 18 | 3.75 | .00 | .00 | .75 | .39 | 5.62 | 5.59 | 1 | 5.49 | 5.35 | 2 |
| 19 | 3.75 | .28 | .19 | .28 | .51 | 4.57 | 4.81 | −5 | 4.31 | 4.40 | −2 |
| 20 | 3.46 | .00 | .35 | .70 | .46 | 4.90 | 5.17 | −6 | 4.55 | 4.65 | −2 |
| 21 | 4.10 | .30 | .10 | .00 | .56 | 3.81 | 3.85 | −1 | 3.68 | 3.58 | 3 |
| 22 | 4.25 | .00 | .00 | .25 | .56 | 3.56 | 3.81 | −7 | 3.55 | 3.51 | 1 |
| 23 | 3.46 | .52 | .26 | .26 | .46 | 5.45 | 5.32 | 2 | 5.19 | 5.12 | 1 | the proportion of carnauba wax, $X_4$ is the proportion of Armour 210 PE, and $X_5$ is the coverage. $B_1$, $B_2$, etc. are constants for each component. Using this equation and the values for composition and coverage of each coating from Table I the constants $B_1$, $B_2$, etc., were determined which would best fit all the data.

The regression equations determined from this analysis were:

Lubrication efficiency (at 150 ft./min.)=0.54 (Tenite 812)+3.83 (Armid-O)−0.30 (carnauba wax)+4.28 (Armour 210 PE)+0.94 (coverage)

Lubrication efficiency (at 200 ft./min.)=0.61 (Tenite 812)+4.31 (Armid-O)−0.86 (carnauba wax)+4.22 (Armour 210 PE)−0.24 (coverage).

The lubrication efficiency values obtained by using these equations are also shown in Table I together with the percent difference between these values and the actual values. An examination of the regression equations and the coefficients for each component (i.e. Tenite 812, Armid-O, carnauba wax, Armour 210 PE, and the coating coverage) shows the relative effect of each on lubrication efficiency. That is: increasing the low density polyethylene or Tenite 812 increases efficiency slightly; increasing the slip additive or Armid-O and Armour 210 PE (the slip and antistatic agent) markedly increases efficiency; and increasing the antiblock agent and hardener (carnauba wax) decreases efficiency.

The regression equations developed for lubrication efficiency have been found to be useful as guides in preparing new compositions for particular applications. In one application films having less roll down than the normal 5:1 roll down ratio were needed. The requirements for these films were that they have a roll down ratio of about 3.6:1 at rolling speeds of 175–200 ft./min. By examining Table I, coating compositions having lubrication efficiencies close to the desired new coating were selected (composition numbers 11, 12, 13 and 15). Graphs were made by plotting the lubrication efficiency values (roll down ratios) previously obtained for these coatings at 150 and 200 ft./min. rolling speeds. By connecting each pair of points the approximate slope for the new coating was determined. FIGURE 2 illustrates the method used. It may be seen that one previous composition (No. 11) did meet the specified requirements since it had a 3.6:1 roll down ratio between 175–200 ft./min. rolling speed, however, it is desirable to have several compositions having different ratios of components in order to obtain a range in other properties such as heat seal strength, slip and block.

From FIGURE 2 it will be seen that the desired coating should have a lubrication efficiency such that the slope of the roll speed to roll down ratio would pass through points having an approximate roll down ratio of 3.80–3.90 at 150 ft./min. and 3.45–3.60 at 200 ft./min. in order to have the specified 3.60:1 roll down ratio between 175 and 200 ft./min. To obtain coatings having this level of lubrication efficiency it is necessary to reduce the proportion of Armid-O or Amour 210 PE in the coating composition. It is preferable to replace Armid-O or Armour 210 PE with Tenite 812 rather than carnauba wax in order to obtain higher heat-seal strengths. Two compositions shown in Table I (Nos. 21 and 22) and in FIGURE 2 were calculated and prepared using the regression equation. The two compositions were coated and compression rolled and actual values for lubrication efficiency were within 1–7% of the calculated values.

In another instance this method was applied in developing a coating composition which would allow film to be rolled at higher speeds and yet still obtain the 5:1 roll down ratio. By referring again to FIGURE 1 it may be seen that as rolling speed increases lubrication efficiency decreases. Therefore, in order to produce a coating which will give a 5:1 roll down ratio at higher speeds than 130–150 ft./min., for example, it is necessary for the coating to have greater lubrication efficiency. This may be done by increasing the proportion of Armid-O and/or Armour 210 PE in the coating.

By examining Table I, the slope and lubrication efficiency values were established for the desired coating using the method outlined in the preceding example. By again using the regression equations a composition having greater lubrication efficiency was developed. (Composition No. 23 in Table I). This composition was coated and compression rolled and had actual lubrication efficiency values with 1–2% of the calculated values. With this composition a 5:1 roll down ratio could be obtained at rolling speeds from about 210–260 ft./min. At 300 ft./min. a roll down ratio of 4.73:1 could be obtained.

Through the use of the novel coating compositions of this invention and the method described above it is possible to develop coatings for rolling at various speeds after first establishing what rolling speed and roll down ratio is desired. In developing any composition for high speed rolling the mechanical limitations of the production rolling mill must be considered.

Also of importance in evaluating coating compositions for commercial use is the range over which acceptable film can be produced by compression rolling. Referring again to FIGURE 1 this is the area between the minimum and maximum roll down ratios represented by the two lines in the diagram. The rolling range value at any particular rolling speed is the difference between the minimum and maximum roll down ratio at that speed. Using the coating compositions in Table I a regression analysis was made of the effect of coating composition and coverage on rolling ranges at 150 and 200 ft./min. At both speeds all components had approximately the same effect on rolling range. However, some differences between coatings having the same composition were observed. The reason for this is thought to be due to the uniformity of the coating thickness. Evidence of this was seen in a recent change made in the coating operation in which an ion blower was installed to eliminate static in the strip just prior to coating. This resulted in a more uniform coating and when the strip was compression rolled broader rolling ranges were obtained. Other than for uniformity the coverage itself had very little effect on rolling range over the area studied (0.39 to 0.56 lb./1000 sq. ft.).

A further understanding of the invention will be had from a consideration of the following examples that may also be used in actual commercial practice and are set forth to illustrate certain preferred embodiments. All percentages given in describing the preparation of the following examples is by weight unless otherwise noted. The heat seals listed hereinbelow were accomplished by subjecting the surface to be sealed to a source of heat which was sufficient to render the surface tacky but not to soften the support material.

Example 1

A solution was prepared containing 5% low density polyethylene (density 0.910 g./cc. and melt index 200) and 95% xylol. No slip agent or carnauba wax was added. The solution was heated to 200° F. to completely dissolve the polyethylene and then cooled to 145° F. The solution was coated onto 5 mil (thick) high density polyethylene (density 0.960 g./cc. and melt index 5.0) using a wire wound rod, the wire having a diameter of 0.036 in. The coating was air dried to evaporate the solvent and then cured for ten minutes at 110° C. to fuse the coating to the high density polyethylene strip. Coating coverage was approximately 0.39 lb. of dry solids/1000 sq. ft.

The coating was compression rolled to 1.0 mil between two 10½ in. diameter steel rolls preheated to 210° F., using 5000 lbs./linear inch pressure, and with the coating softening and acting as a rolling lubricant.

Properties of this film were:

Heat seal strength, lbs./in. (obtained using heating iron at approximately 225° F. with dwell time of one second) _____ 0.86
Coefficient of friction:
    Static _____ >2.0
    Kinetic _____ >2.0

Referring to the requirements mentioned previously which a heat seal coated film must have to be commercially practical it is seen that while this film has a very acceptable heat seal strength the coefficient of friction is much too high for feeding properly in automatic packaging machines.

Example 2

Using the method of Example 1 a solution was prepared containing 5% low density polyethylene (density 0.910 g./cc. and melt index 200); 1.0% carnauba wax; and 94% xylol. No slip agent was added. After coating, curing, and compression rolling, as in Example 1, the properties of this coated film were:

Heat seal strength, lbs./in. _____ 0.19
Coefficient of friction:
    Static _____ 0.53
    Kinetic _____ 0.54

The heat seal strength of this film is below the minimum requirement and the kinetic coefficient of friction is too high.

If the ratio of polyethylene to carnauba wax were decreased the heat seal strength would decrease further. If the ratio of polyethylene to carnauba wax were increased the coefficient of friction would increase. Therefore, if only polyethylene and carnauba wax are used in the coating composition no commercially acceptable films can be obtained.

Example 3

Using the method of Example 1 a solution was prepared containing 5% low density polyethylene (density 0.910 g./cc. and melt index 200); 1.0% oleamide and 94% xylol. No carnauba wax was added. After coating, curing, and compression rolling, as in Example 1, the properties of this coated film were:

Heat seal strength, lbs./in. _____ 0.33
Coefficient of friction:
    Static _____ 0.10
    Kinetic _____ 0.09

While heat seal strength and coefficient of friction of this film are acceptable it had a soft, greasy surface and packages overwrapped with this film blocked together.

Other coating compositions have been prepared having different ratios of polyethylene to oleamide but no combination has been found having both acceptable surface quality and no blocking.

Example 4

Using the method of Example 1 a solution was prepared containing 5% low density polyethylene (density 0.910 g./cc. and melt index 200); 0.5% oleamide; 0.5% carnauba wax; and 94% xylol. After coating, curing, and compression rolling, as in Example 1, the properties of this coated film were:

Heat seal strength, lbs./in. _____ 0.29
Coefficient of friction:
    Static _____ 0.13
    Kinetic _____ 0.12
Moisture vapor transition (grams/100 sq. in./24 hrs.) _____ 0.23
Haze, percent _____ 1.5
Tensile strength, p.s.i.:
    Length _____ 21,700
    Width _____ 4,700
Elongation, percent:
    Length _____ 81
    Width _____ 3.0
Young's modulus, p.s.i.:
    Length _____ 450,000
    Width _____ 370,000

Heat seal strength and coefficient of friction of this film are acceptable. The film did not have a greasy surface and packages overwrapped with this film did not block together.

Further study on coating composition determined that acceptable commercially practical coatings were obtained only when the ratio of polyethylene to additives (slip agents and carnauba wax) was more than 2.5:1 polyethylene:additives but less than 55:1 polyethylene:additives. The preferred ratio is between 3:1 to 10:1 polyethylene:additives. The following examples illustrate this.

Example 5

A solution was prepared containing 3.21% low density polyethylene (density 0.910 g./cc. and melt index 200); 0.43% oleamide; 0.43% carnauba wax; 0.43% Armour 210 PE; and 95.5% xylol. In order to completely dissolve all components the solution was prepared at 200° F. The solution was then cooled to 145° F. and coated onto 5 mil high density polyethylene (density 0.960 g./cc. and melt index 5.0) using an extrusion hopper coater. The coated strip was passed through a four section forced air oven having a temperature of 130° F. in the first section and increasing to 240° F. in the fourth. In this way the solvent was first evaporated and the dried coating was then fused to the high density polyethylene strip. In a similar manner the same coating was applied to the opposite side of the strip. Coating coverage on each side of the strip was 0.39 lb. of dry solids/1000 sq. ft.

The coated strip was compression rolled to 1.0 mil between two 19 in. diameter steel rolls preheated to 240° F., using 1300 lbs./linear inch pressure, and with the coating softening and acting as a rolling lubricant.

Properties of this film were:

Heat seal strength, lbs./in. _____ 0.17
Coefficient of friction:
    Static _____ 0.11
    Kinetic _____ 0.11

Referring to the requirements mentioned previously which a commercially practical heat seal coated film must have, it is seen that the coefficient of friction of this film is in the right range but that heat seal strength is too weak. This shows that the ratio of low density polyethylene to additives (2.5:1) in this coating composition is too low.

Example 6

Using the same method as in Example 5 a solution was prepared containing 3.46% low density polyethylene (density 0.910 g./cc. and melt index 200; 0.35% oleamide; 0.35% carnauba wax; 0.35% Armour 210 PE; and 95.5% xylol. After coating, curing, and compression rolling, as in Example 5, the properties of this coated film were:

Heat seal strength, lbs./in. _____ 0.32
Coefficient of friction:
    Static _____ 0.11
    Kinetic _____ 0.10

As can be observed, the heat seal strength and coefficient of friction of this film are acceptable. Film fed properly and packages overwrapped on automatic packaging machines had strong heat seals. This shows that the ratio of low density and polyethylene to additives (3.3:1) in this coating composition is in the acceptable range.

Example 7

Using the same method as in Example 5 a solution was prepared containing 5% low density polyethylene (density 0.910 g./cc. and melt index 200); 0.03% oleamide; 0.03% carnauba wax; 0.03% Armour 210 PE; and 94.91% xylol. The solution was coated onto 5 mil high density polyethylene (density 0.960 g./cc. and melt index 5.0) using a wire wound rod, the wire having a diameter of 0.036 in. The coating was air dried to evaporate the solvent and then cured at 110° C. for 10 minutes. Coating coverage was approximately 0.39 lb. of dry solids/ 1000 sq. ft.

The coated strip was compression rolled to 1.0 mil between two 10½ in. diameter steel rolls preheated to 210° F., using 4000 lbs./linear inch pressure, and with the coating softening and acting as a rolling lubricant.

Properties of this film were:

| | |
|---|---|
| Heat seal strength, lbs./in. | 0.57 |
| Coefficient of friction: | |
| Static | 1.14 |
| Kinetic | 1.04 |

Heat seal strength of this film is acceptable but coefficient of friction is too high and the film will thus not feed properly in automatic packaging machines. This shows that the ratio of low density polyethylene to additives (55:1) in this coating composition is too high.

As mentioned previously an important part of this invention is the softening of the heat seal coating during compression rolling to form a rolling lubricant for the high density polyethylene strip. This is accomplished by preheating the compression rolls to a temperature above the softening point of the coating. It has been found that by varying the proportion of each component in the heat seal composition, low density polyethylene, slip agents, and carnauba wax, that extreme changes in lubricity can be obtained. The lubricity of the coating in turn determines how much increase in length will occur when the film is compression rolled. The ratio of *length after compression rolling to length before compression rolling* we have termed "roll down ratio." For example, if a 5 mil high density polyethylene strip were compression rolled to 1 mil it would become 5 times longer and its "roll down ratio" would be 5:1.

Example 8

During the compression rolling of the film prepared in Example 6 the compression rolling speed had the following effect on lubricity:

| Compression rolling speed, ft./min.: | Roll down ratio |
|---|---|
| 100 | 5.23 |
| 150 | 4.99 |
| 200 | 4.69 |
| 250 | 4.46 |
| 300 | 4.22 |

This example shows that compression rolling speed must be taken into consideration when developing coating compositions. On the other hand, compression rolling speed may be used to vary roll down ratio over a limited area. For some packaging applications it is necessary to put other types of additives, such as antistatic agents, into a coating composition. In order to do this the coating composition must be adjusted so that other properties will not be adversely affected. Example 9 illustrates this:

Example 9

Part A.—Using the method of Example 5, a solution was prepared containing: 3.92% low density polyethylene (density 0.910 g./cc. melt index 200); 0.41% oleamide; 0.41% carnauba wax; 0.41% Armour 210 PE; and 94.8% xylol. This solution was coated onto 4.3 mil high density polyethylene (density 0.960 g./cc. melt index 5.0) and then cured and compression rolled as in Example 5.

The film had the following properties:

| | |
|---|---|
| Heat seal strength, lbs./in. | 0.37 |
| Coefficient of friction: | |
| Static | 0.15 |
| Kinetic | 0.11 |

Part B.—Using the same method a solution was prepared containing: 3.92% low density polyethylene (density 0.910 g./cc. melt index 200); 0.41% oleamide; 0.41% carnauba wax; 0.33% Armour 210 PE; 0.08% N-cetyl N-ethyl morpholinium ethosulfate (used as an anti-static agent); and 94.85% xylol. As may be seen when comparing this composition to the preceding one 0.08% of the Armour 210 PE has been replaced by 0.08% N-cetyl-N-ethyl morpholinium ethosulfate. This solution was coated onto 4.3 mil high density polyethylene (density 0.960 g./cc. melt index 5.0) and then cured and compression rolled in the same manner as Part A.

Lubricity of this coating was similar to the coating in Part A. The film had the following properties:

| | |
|---|---|
| Heat seal strength, lbs./in. | 0.42 |
| Coefficient of friction: | |
| Static | 0.18 |
| Kinetic | 0.12 |

Electrification measurements on the films with and without antistatic agent were as follows:

| | |
|---|---|
| Chargemeter | Surface. |
| Value | Resistivity. |
| 4 min. | $\times 10^{-10}$ ohm. |
| E.s.u./cm. | |
| With antistatic agent: | |
| +1.0 | 3,500. |
| Without antistatic agent: | |
| −4.4 | 20,000. |

Example 10

16.3 lbs. of a polyethylene resin having a density of 0.910 and melt index of 200 was dissolved in 122 lbs. of xylene heated to 200° F. 3.25 lbs. of carnauba wax, 3.25 lbs. of an oleamide, 0.65 lb. of polyoxyethylene sorbitan stearate, and 2.60 lbs. of sorbitan stearate were dissolved in the hot xylene dope. This heated dope was added to 177 lbs. of distilled water preheated to 200° F. While the dope was being added to the hot water the mixture was vigorously agitated to obtain instant mixing. The hot mixture was homogenized in a homomixer and then gradually cooled to room temperature.

The emulsion was coated onto both sides of a 4.5 mil sheet of polyethylene having a density of 0.960 and melt index of 5.0 The emulsion was applied by passing the sheet through a bath of the emulsion and then removing the excess emulsion by passing the sheet between two wire wound rods, the wire having a diameter of 0.024 inch. After coating the surface deposit was cured and fused by passing through an air-loop dryer heated to 190–215° F. After drying and fusing the sheet had excellent slip and anti-blocking properties and could be heat sealed at 220° F. and clamped to produce 1,000 pounds/ linear inch pressure on the sheet. Physical properties which were determined on this film were:

| | |
|---|---|
| Moisture vapor transmission (grams/100 sq. in./24 hrs.) | 0.30 |
| Percent haze | 2.4 |
| Temp. at 2% shrinkage, ° C. | 106 |
| Tensile strength, p.s.i.: | |
| Yield (machine direction) | 24,000 |
| Break: | |
| Length | 24,600 |
| Width | 5,800 |
| Percent elongation: | |
| Yield (machine direction) | 22.9 |

Break:
Length ......................... 30.8
Width .......................... 2.6
Young's modulus (p.s.i.):
Length ......................... 590,000
Width .......................... 380,000

Samples of the coated sheet were also compression rolled with the rolls heated to 220° F. to produce films .0009 inch thick. These films were applied as overwrap to packages of cigarettes from an unmodified Scandia cigarette overwrap machine with the end sealing bars heated to 250–275° F. and side sealing bar heated to 270–290° F.

Physical properties determined on the compression rolled .0009 inch films were:

Moisture vapor transmission (grams/100 sq. in./24 hrs.) .................. 0.32
Percent haze ............................... 2.47
Temp. at 2% shrinkage, ° C. ................ 107
Tensile p.s.i.:
Yield (machine direction) ............ 24,500
Break:
Length ........................... 25,500
Width ............................ 5,500
Percent elongation:
Yield (machine direction) ............ 27.7
Break:
Length ........................... 68.9
Width ............................ 3.5
Young's modulus (p.s.i.):
Length ............................... 520,000
Width ................................ 370,000

Both films exhibited excellent slip and antiblocking properties. Scuff resistance of these films was significantly superior to that of films prepared from the low density, high melt index polyethylene but was inferior to that of uncoated high density polyethylene films.

From the foregoing it can be seen that the new polyethylene film of this invention offers numerous advantages over any that was heretofore known or available to the industry. For example, not only does this novel high density polyethylene film exhibit a low sealing temperature point and exceptionally high strength thus making its use in cellophane-type wrapping machines most attractive, but the film also is self-lubricating. This characteristic is of particular importance since a manufacturer can purchase relatively thick film and compression roll it to his own specification without any pre-rolling conditioning steps being required. Furthermore, since the coating need only be applied in an exceptionally thin layer to be most effective, very little expense is involved in coating the high density polyethylene support film. In fact, for best results the coating mixture is so thin (.01 to .08 mil. after rolling) that it appears as a lace-like network rather than a continuous film. The variation within the prescribed ranges that can be made in the basic components from which the coating is blended is also important since this gives the user of the coated film a wide variety of different heat-sealable and compression rolling characteristics from which he can pick the one best suited for his particular use.

What is claimed and desired to be secured by the United States Letters Patent is:

1. As a new article of manufacture, a plastic film having a total composite thickness of about 1 to 10 mils and consisting essentially of a preformed high density polyethylene film and a self-lubricating, heat-sealable coating placed on at least one side of said polyethylene film, said coating consisting of at least (1) a low density, low molecular weight polyethylene, said low density polyethylene having a melt index greater than 20 and a density less than 0.920 g./cc.

(2) a fatty amide derivative; and (3) carnauba wax, the weight ratio of said low density polyethylene to the combined total weight of said fatty amide derivative and said carnauba wax being greater than 2.5:1 and less than 55:1 respectively and said plastic film being heat-sealable at moderately elevated temperatures of below about 300° F.

2. The new article of manufacture according to claim 1 wherein the low density, low molecular weight polyethylene has a tack temperature at least 20° F. below the tack temperature of said preformed high density polyethylene film.

3. The new article of manufacture according to claim 2 wherein the fatty amide derivative acts as a slip agent and compression rolling lubricant.

4. The new article of manufacture according to claim 2 wherein from about 0.35 to about 0.60 pounds of said coating is applied to the preformed high density polyethylene film per 1000 square feet of film surface.

5. The new article of manufacture according to claim 4 wherein the coating on the preformed high density polyethylene film is discontinuous and from about .01 to about .08 mil. thick.

6. A process for producing and heat sealing a self-lubricating, high slip, heat-sealable polyethylene film comprising the steps of blending together a low density polyethylene having a melt index greater than 20 and a density less than 0.92 g./cc., an oleamide, and carnauba wax to thereby form a compression rolling and sealing aid, depositing a thin layer containing from about 0.35 to about 0.6 lb. of the compression rolling and sealing aid per 1000 square feet of treated surface on at least one surface of a high density polyethylene film, compression rolling the resulting coated high density polyethylene film, placing the coated surface of said compression rolled high density polyethylene film in contact with a second surface of a high density polyethylene film with said compression rolling and sealing aid disposed therebetween, and heating said high density polyethylene film surfaces to a sealing temperature below the tack temperature of the high density polyethylene; the weight ratio of said low density polyethylene to the combined total weight of said oleamide and said carnauba wax being greater than 2.5:1 and less than 55:1 respectively.

7. A process according to claim 6 wherein the ratio of low density polyethylene to the combined total weight of said oleamide and said carnauba wax is between 3:1 and 10:1 respectively.

8. A process according to claim 6 wherein said compression rolling and sealing aid is dissolved in a solvent and coated onto said high density polyethylene film.

9. A process according to claim 6 wherein the thickness of the compression rolling and sealing aid coating is between .01 and .08 mil in thickness after rolling.

10. A process according to claim 6 wherein the sealing temperature is at least 20° F. below the tack temperature of the high density polyethylene.

11. A process according to claim 10 wherein the sealing temperature is below 300° F.

12. A process according to claim 6 wherein the roll down ratio of the coated high density polyethylene film is at least 5:1 and is obtained at rolling speeds up to about 300 feet per minute.

13. A process according to claim 6 wherein the thickness of the compression rolled heat-sealable, high-density polyethylene film is between about 0.5 and about 5 mils.

14. A process for producing a self-lubricating, high slip, heat-sealable high density polyethylene sheet comprising the steps of dissolving a low density polyethylene having a melt index greater than 20 and a density less than 0.92 g./cc., and oleamide and carnauba wax; the ratio of the weight of said low density polyethylene to the combined weight of said oleamide and said wax being between 2.5:1 and 55:1 respectively; in a solvent to form a dope, applying the dope to a sheet of high density polyethylene, removing the solvent from the dope thereby leaving a discontinuous powder composed of low density polyethylene and said oleamide and said wax on the sheet, and fusing the powder to the sheet at a temperature greater than the melting point of the powder but less than the melting point of the sheet.

15. A bonded article comprising at least two surfaces of compression rolled high density polyethylene sheet material heat sealed together with a sealing aid consisting of low density polyethylene blended in a ratio of between 2.5 and 55 parts polyethylene to 1 part of a mixture of an oleamide and carnauba wax; the melt index of said low density polyethylene being greater than 20; the density of said low density polyethylene being less than 0.92 g./cc., and the thickness of the sealing aid layer being about .01 to about .08 mil.

References Cited

UNITED STATES PATENTS

| | | |
|---|---|---|
| 2,499,486 | 3/1950 | Fuller _____ 260—28.5 |
| 2,642,366 | 6/1953 | Rumberger _____ 260—28.5 |
| 2,770,608 | 11/1956 | Barker et al. _____ 260—28.5 XR |
| 3,061,493 | 10/1962 | Anderson _____ 260—28.5 XR |
| 3,230,191 | 1/1966 | Roedel _____ 260—28.5 |
| 2,882,246 | 4/1959 | Leatherman et al. ___ 260—28.5 |
| 3,232,789 | 2/1966 | Pelzek et al. _____ 117—138.8 |
| 3,343,969 | 9/1967 | Padgett et al. ___ 260—28.5 XR |
| 3,362,839 | 1/1968 | Weindel _____ 260—28.5 XR |
| 3,397,163 | 8/1968 | Bruno et al. ____ 117—138.8 XR |

ROBERT F. BURNETT, Primary Examiner

ROGER H. CRISS, Assistant Examiner

U.S. Cl. X.R.

117—138.8, 161, 167; 156—309, 334; 161—165, 234, 252; 260—28.5